United States Patent Office 3,563,771
Patented Feb. 16, 1971

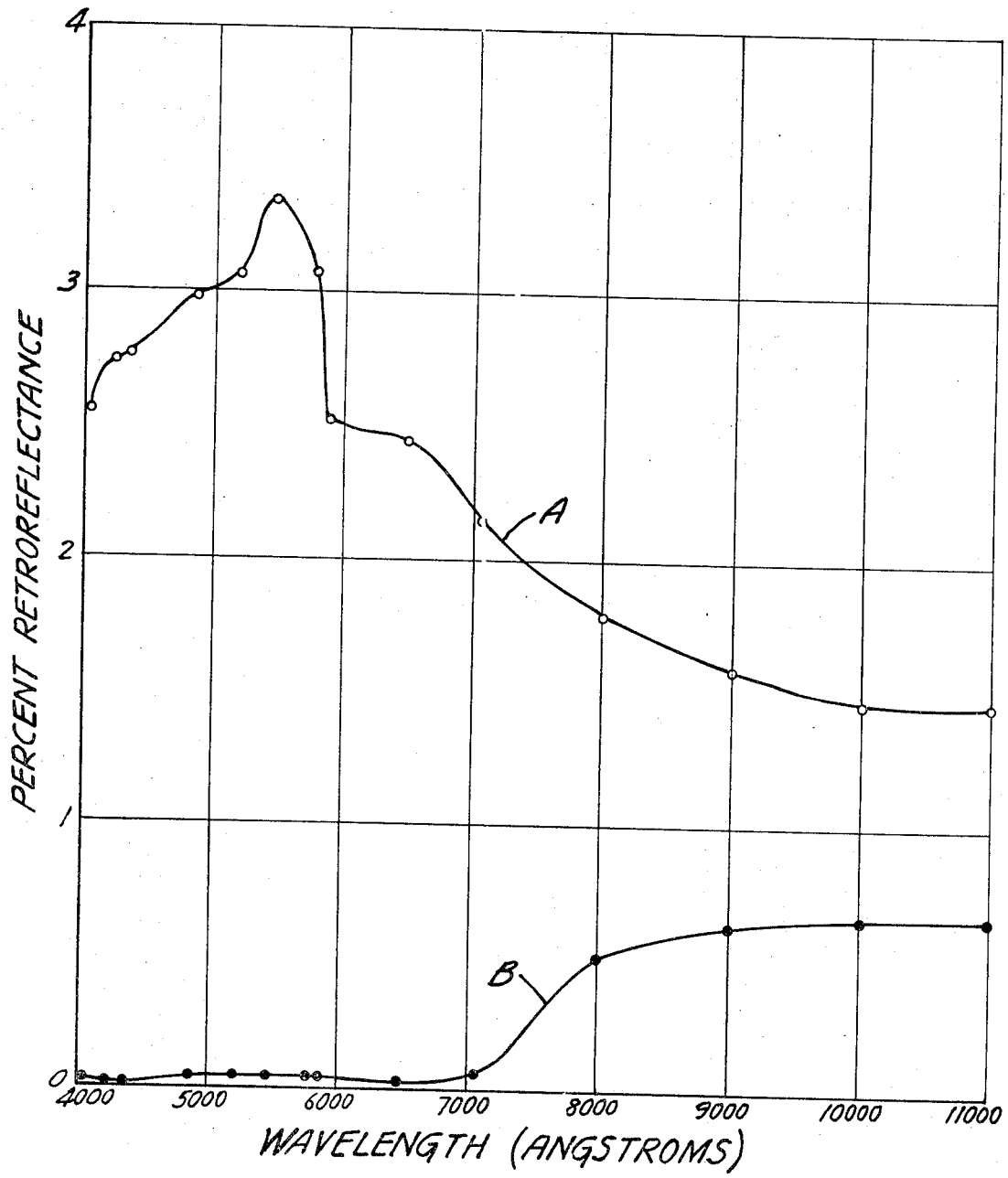

3,563,771
NOVEL BLACK GLASS BEAD PRODUCTS
Chi Fang Tung, Lincoln Township, Washington County, Minn., assignor to Minnesota Mining and Manufacturing Company, St. Paul, Minn., a corporation of Delaware
Filed Feb. 28, 1968, Ser. No. 708,831
Int. Cl. C03c 3/00
U.S. Cl. 106—47                                         9 Claims

ABSTRACT OF THE DISCLOSURE

Novel, essentially nondevitrified, black glass elements of high refractive index which are highly transmissive to infrared light and highly absorptive of visible light, said glass consisting essentially of a base glass component having ingredients capable of forming a glass with an index of refraction of at least 1.6 and dissolved light filtering components consisting essentially of 0.1–3 weight percent $Cr_2O_3$, 1–15 weight percent $MnO_2$, 0.1–10 weight percent CoO, 0–8.7 weight percent $V_2O_5$, 0–10 weight percent FeO, 0–5 weight percent NiO, 0–5 weight percent CuO, 0–15 weight percent $CeO_2$.

---

This invention relates to high refractive index glass elements which absorb essentially all visible light from 3800 to 7600 A. wavelength and which have high transmission in the infrared region, including the near infrared of about 8000 to 11,000 A.

Although various glass formulations and elements, particularly in bead form, have been described in the literature, high refractive index glass elements which are selectively transmissive to infrared and also are capable of absorbing substantially all visible light have been difficult to formulate. Usually the solution to this problem has involved a compromise, sacrificing absorption of a portion of the visible light spectrum to achieve a measure of infrared transmission. Obtaining infrared transmission in the near infrared region while maintaining very low transmission (i.e., very high absorption) in the visible range has been a problem of even greater magnitude.

Glass beads have found many useful applications. They have been used extensively in various constructions for reflex-reflective response, e.g., road signs and markers. They have been incorporated in highway marking paints and have been used as means for marking, coding and counting objects, such as described in U.S. Pat. No. 3,225,177 (F. H. Stites et al., Sept. 13, 1961). Glass beads prepared in accordance with this invention not only can be used in these applications but also may be formulated into products which, though apparently opaque, nonreflective, and black in appearance, may be detected with an infrared light source and an infrared detector. Among objects which can be "marked" without the reflex-reflective elements being visible to the naked eye are automobiles, railroad cars, aircraft, etc. They can be used for tamper-proof identification systems, for copying and graphic arts applications, for marking inks and paints, for highly selective filtration of electromagnetic irradiation, etc.

The figure shows a plot of percent retroreflectance vs. wavelength for a clear, high refractive index glass bead (curve A) and a glass bead of this invention (curve B).

The glass elements of this invention are noncrystalline, have a high refractive index value (at least 1.6 and preferably at least 1.8), a reflective intensity no greater than 25 (preferably no greater than 10 candle power per footcandle per square foot), and appear black to the eye under ordinary daylight conditions. Although such compositions have a tendency to devitrify and crystallize when cooled too slowly, if the thickness of the elements does not exceed about 2 millimeters, rapid cooling of the molten glass will produce a noncrystalline, nondevitrified product. The resulting glass elements may be in various forms, such as beads, fibers, flakes, thin plates, filaments, and preferably have a thickness no greater than 0.2 millimeter, e.g., from 15 microns to 10 mils. The composition of the glass elements comprises certain light filtering components dissolved in a high refractive index base glass. The light filtering mixture consists essentially of oxides of metals having an atomic number from 23 to 29 and 58, as set forth in Table I, wherein the total weight percent of the oxides constitutes from about 1 to about 20 weight percent, preferably 5 to 20 weight percent, of the total formulation, i.e., base glass and light filtering components.

TABLE I

| Metal oxide: | Weight percent of total formulation |
|---|---|
| $Cr_2O_3$ | 0.1–3 (preferably 0.1–1). |
| $MnO_2$ | 1–15 (preferably 2–10). |
| CoO | 0.1–10 (preferably 0.9–5). |
| $V_2O_5$ | 0–8.7. |
| FeO | 0–10 (preferably 0.1–10). |
| NiO | 0–5 (preferably 0.1–5). |
| CuO | 0–5. |
| $CeO_2$ | 0–15. |

Many clear, essentially uncolored, nondevitrified glasses having an index of refraction of at least 1.6 have been known, as illustrated by the disclosure of U.S. 2,726,161; 2,790,723; 2,842,446; 2,853,393; and 2,870,030. Any of these may be used as the base glass formulation in which light filtering components of this invention are dissolved, although the solubility of particular light filtering components in the base glass will vary somewhat with the base glass formulation and the manufacturing techniques. Preferred base glass mixtures have an index of refraction from 1.8 to 2.7 and consist essentially of metal oxides within ranges set forth in Table II.

TABLE II

| Metal oxide: | Weight percent of total formulation |
|---|---|
| $TiO_2$ | 20–95 (preferably 20–50). |
| BaO | 20–40. |
| BaO+PbO | 30–50. |
| $SiO_2$ | 0–40 (preferably 10–20). |
| $B_2O_3$ | 0–10. |
| Alkali metal oxide | 0–30. |

The amount of $TiO_2$ may be varied to improve the solubility of the light filtering components therein and the divergence angle of the product. Although the base glass preferred mixture is essentially as shown in Table II, for reasons of meltability, cost or minor adjustment of properties it is possible to include minor amounts, i.e., less than 10 weight percent total, of other glass forming metal oxides, e.g., zinc oxide, alkaline earth oxides, cadmium oxide, germanium oxide, etc. However, the presence of metal sulfides is to be avoided.

The manufacture of these glass elements uses conventional technology, as now described in U.S. Pat. No. 2,992,122 (July 11, 1961—W. R. Beck and C. F. Tung). Light filtering components are intimately mixed, dried, then added to the base glass components. The final formulation can be melted in a gas fired furnace, fritted by quenching in cold water, dried, crushed, and screened. To form glass beads the classified fritted particles, i.e., glass cullet, is fed through a flame and then preferably screened to provide a 200 mesh (U.S. Standard Sieve) fraction. The beads may be hemispherically coated with a reflective material, such as a chemically deposited or vapor deposited metal coating (e.g., silver, aluminum, gold, copper, etc.) depending on their intended use. If desired, the beads may be heat treated to lower even further the transmission in the visible light range with only a slight reduction in the infrared transmission.

The total glass composition is characterized by a high integrated retroreflectance ratio of infrared light (7600–11,000 A.) to total light (i.e., visible plus infrared as measured from 4000–11,000 A.) referred to as the $IR/(IR+V)$ ratio, which value is at least 0.65, preferably at least 0.75 and most preferably at least 0.80, as measured in the following manner.

For testing the retroreflectance in the visible range (4000–7000 A.) at room temperature a tungsten light source (G.E. 1493 lamp masked to reveal a half inch diameter aperture) at a color temperature of 2850° K. is used in conjunction with a Wratten 106 filter, an appropriate sharp cutoff filter passing light in the desired narrow portion of the visible band, and R.C.A. No. 6199 phototube (S-11 response curve) masked to reveal a half inch diameter aperture. The combination of the phototube and the Wratten 106 filter approximates the response of the average human eye, and therefore the test measurement is directly proportional to the human eye visibility under such illumination. The equipment used for testing retroreflectance in the near infrared region (7600–11,000 A.) included a tungsten light source (30-watt American Optical Company microscope illuminator with a G.E. 1493 lamp having a half-inch diameter aperture) at a color temperature of 2650° K., the appropriate sharp cut-off infrared filter passing the light in the desired narrow portion of the infrared band and an R.C.A. phototube 7102 (S-1 response curve) having a half-inch diameter opening. The test system was designed to permit the conversion of the measured values to values based on illumination providing radiant power of the same spectral intensity over the range of wavelengths tested. The resulting data is plotted as percent retroreflectance (i.e., percent reflected light/incident light) versus wavelength. Because all measurements were made with illumination providing radiant power of the same spectral intensity, the ratio of the area under the plotted curve of percent retroreflectance vs. wavelength over the range of infrared wavelengths (i.e., 7600–11,000 A.) to the area under the curve over the total visible and infrared range (i.e., 3800–11,000 A.) is the "integrated retroreflectance ratio," mentioned earlier. The test samples are made by applying a thin adhesive layer to a flat, nonreflective black surface. Then a mono-layer of the glass beads which have been fully coated with silver (applied by chemical deposition) is applied to the adhesive layer to imbed these glass beads up to about 50 percent of their diameter in the adhesive layer. Subsequent acid etching of the exposed surface portions of the beads removes the silver therefrom. Each sample was then masked so as to expose a circular area approximately 1 inch in diameter for testing in the above procedure. In the test apparatus it is important to maintain the same distance between the light source and the sample as between the sample and the detector tube. This was accomplished by incorporating a 50 percent transmission mirror (a "half mirror") between the light source and the sample, this mirror transmitting the light from the source to the sample and reflecting the retroreflected light from the sample to the adjacent photo detector tube. An optically flat mirror is used at the sample position to calibrate the apparatus before each measurement.

The invention is illustrated by the examples in Table III showing exemplary glass compositions and the transmission characteristics of each. Example 1 represents an essentially uncolored, high index base glass without the light filtering ingredients of this invention. The remaining examples illustrate the high integrated retroreflectance ratio achieved when the high refractive index base glass contains such light filtering ingredients. Curve A in the figure represents the plot of percent retroreflectance vs. wavelength of the essentially uncolored base glass of Example 1, and curve B is a similar plot for the visible light absorptive, infrared, light transmissive, glass of Example 12. A comparison of curves A and B shows the significantly higher percent retroreflectance in the visible range of the essentially uncolored glass of Example 1 as compared to the extremely low retroreflectance in the visible range for the glass of Example 12. It is also significant to note that curve B shows a substantial percent retroreflectance in the infrared wavelengths for the glass elements of this invention.

Although the glass elements of this invention have been characterized as noncrystalline and nondevitrified, it should be understood that some scattered crystallinity occasioned by slight devitrification (believed not to exceed about 5 percent by weight of the glass elements) is, of course, not objectionable and may be present as a desirable phase in almost any glass. It should also be understood that the selection of raw materials and glass manufacturing techniques may cause some variation in the oxidative state of the metals in the oxides of the final glass. Therefore although the particular metal oxides set forth earlier and in Table III represent the actual metal oxides predominating in the final glass, oxides of those metals at different oxidative states may also be included. Following conventional practice the concentration of each metal oxide, irrespective of the oxidative state of the metal, is reported as weight percent of the recited metal oxide formula.

TABLE III

| Ex.[1] | Light filtering oxides (wt. percent) | | | | | | | | Base glass oxides (wt. percent) | | | | | | $IR/(IR+V)$ | Visible light reflective intensity |
|---|---|---|---|---|---|---|---|---|---|---|---|---|---|---|---|---|
| | CoO | NiO | $MnO_2$ | $Cr_2O_3$ | $CeO_2$ | $V_2O_5$ | FeO | CuO | $Na_2O$ | $K_2O$ | BaO | $B_2O_3$ | $TiO_2$ | $SiO_2$ | | |
| 1 | | | | | | | | | 9.14 | 1.44 | 39.33 | 2.38 | 43.32 | 14.41 | 0.263 | 367.0 |
| 2 | 4.46 | | 5.36 | 0.89 | | | | | 8.16 | 1.29 | 26.19 | 2.12 | 38.66 | 12.87 | 0.809 | 0.36 |
| 3 | 2.50 | | 5.00 | 0.83 | | 8.33 | | | 7.62 | 1.20 | 24.44 | 1.98 | 36.08 | 17.01 | 0.688 | 2.3 |
| 4 | 1.30 | | 2.61 | 0.43 | | 8.70 | | | 7.95 | 1.25 | 25.50 | 2.07 | 37.65 | 12.53 | 0.682 | 15.8 |
| 5 | 1.68 | 0.84 | 5.05 | 2.53 | 5.64 | | | | 7.70 | 1.21 | 24.71 | 2.01 | 36.48 | 12.14 | 0.851 | 0.14 |
| 6 | 2.61 | | 5.22 | 0.87 | | 4.35 | | | 7.95 | 1.25 | 25.50 | 2.07 | 37.65 | 12.53 | 0.856 | 1.58 |
| 7 | 2.61 | | 5.22 | 0.87 | | | 4.27 | | 7.95 | 1.25 | 25.50 | 2.07 | 37.65 | 12.53 | 0.867 | 0.14 |
| 8 | 2.63 | | 8.77 | 0.88 | | | | | 8.02 | 1.26 | 25.73 | 2.09 | 37.98 | 12.64 | 0.877 | 0.29 |
| 9 | 0.91 | | 5.45 | 2.73 | | | | | 8.31 | 1.31 | 26.66 | 2.16 | 39.36 | 13.10 | 0.861 | 6.8 |
| 10 | 2.78 | 1.39 | 2.78 | 0.46 | | | | | 8.46 | 1.33 | 27.16 | 2.20 | 40.09 | 13.34 | 0.844 | 0.58 |
| 11 | 2.69 | 1.35 | 5.38 | 0.90 | | | | | 8.20 | 1.29 | 26.30 | 2.13 | 38.83 | 12.92 | 0.844 | 0.14 |
| 12 | 2.69 | 1.35 | 5.38 | 0.90 | | | | | 8.84 | 1.39 | 28.39 | 2.30 | 34.83 | 13.94 | 0.911 | 0.14 |
| 13 | 2.37 | 1.18 | 4.75 | 0.79 | | | | | 8.96 | 1.41 | 28.77 | 2.34 | 35.30 | 14.13 | 0.705 | 0.14 |
| 14 | 1.94 | 0.96 | 3.86 | 0.65 | | | | | 9.13 | 1.44 | 29.31 | 2.38 | 35.95 | 14.39 | 0.851 | 0.72 |
| 15 | 1.48 | 0.74 | 2.95 | 0.49 | | | | | 9.30 | 1.46 | 29.86 | 2.42 | 36.63 | 14.66 | 0.781 | 3.17 |
| 16 | 2.61 | | 5.22 | 0.87 | | | | 4.35 | 7.95 | 1.25 | 25.50 | 2.07 | 37.65 | 12.53 | 0.883 | 0.14 |

[1] Reflective Intensity (candlepower per foot-candle per square foot) measured with 2,850°K. minimum color temperature tungsten illumination source using the procedure and apparatus described in published United States Federal Specification ("Sheeting and Tape, Reflective; Nonexposed Lens, Adhesive Backing") No. L-S-300 (September 7, 1965), except exposed lens sheeting samples were used and measurements were made at 0.2 divergence angle and —4° incidence angle.

[2] All glass beads used had an average diameter of from about 37 microns (200 mesh U.S. standard) to about 74 microns (400 mesh U.S. standard).

Various other embodiments of the present invention will be apparent to those skilled in the art without departing from the scope thereof.

What is claimed is:

1. Infrared transmissive, visible light absorptive, essentially nondevitrified black glass elements having an index of refraction of at least about 1.6, a visible light reflective intensity no greater than about 25 candlepower per foot-candle per square foot, an integrated retroreflectance ratio of infrared light (7600 to 11,000 angstroms) to total light (4000 to 11,000 angstroms) of at least about 0.65 and a thickness below about 2 millimeters and consisting essentially of a clear, essentially uncolored base glass component, the ingredients of which together are capable of forming a glass having an index of refraction of at least 1.6, and light filtering components dissolved therein, said light filtering components consisting essentially of

| | |
|---|---|
| $Cr_2O_3$ | 0.1–3 |
| $MnO_2$ | 1–15 |
| CoO | 0.1–10 |
| $V_2O_5$ | 0–8.7 |
| FeO | 0–10 |
| NiO | 0–5 |
| CuO | 0–5 |
| $CeO_2$ | 0–15 | wherein all of said amounts are specified in weight percent of the total glass composition, the light filtering components constituting from about 1 to about 20 weight percent of the total glass composition.

2. The infrared transmissive, visible light absorptive, essentially nondevitrified glass elements of claim 1 wherein said light filtering components consist essentially of

| | Weight percent |
|---|---|
| $Cr_2O_3$ | 0.1–1 |
| $MnO_2$ | 2–10 |
| CoO | 0.9–5 |
| $V_2O_5$ | 0–8.7 |
| FeO | 0–10 |
| NiO | 0–5 |
| CuO | 0–5 |
| $CeO_2$ | 0–15 |

3. The infrared transmissive, visible light absorptive, essentially nondevitrified glass elements of claim 2 having from 0.1 to 10 weight percent of FeO.

4. The infrared transmissive, visible light absorptive, essentially nondevitrified glass elements of claim 1 in which the base glass component consists essentially of

| | Weight percent |
|---|---|
| $TiO_2$ | 20–95 |
| BaO | 20–40 |
| BaO+PbO | 30–50 |
| $SiO_2$ | 0–40 |
| $B_2O_3$ | 0–10 |
| Alkali metal oxides | 0–30 |

5. The infrared transmissive, visible light absorptive, essentially nondevitrified glass elements of claim 1 in which the base glass component consists essentially of

| | Weight percent |
|---|---|
| $TiO_2$ | 20–50 |
| BaO | 20–40 |
| BaO+PbO | 30–50 |
| $SiO_2$ | 10–20 |
| $B_2O_3$ | 0–10 |
| Alkali metal oxides | 0–30 |

6. The infrared transmissive, visible light absorptive, essentially nondevitrified glass elements of claim 1 in which said elements are beads having a diameter no greater than 0.2 millimeter and a refractive index of at least 1.8.

7. The infrared transmissive, visible light absorptive, essentially nondevitrified glass elements of claim 1 in which said integrated retroreflectance ratio is at least 0.75.

8. The infrared transmissive, visible light absorptive, essentially nondevitrified glass elements of claim 1 in which said reflective intensity is no greater than about 10.

9. The infrared transmissive, visible light absorptive, essentially non-devitrified glass elements of claim 1 in which said elements are beads having a diameter from 15 microns to 10 mils and a refractive index of at least about 1.8.

References Cited

UNITED STATES PATENTS

| | | | |
|---|---|---|---|
| 2,856,303 | 10/1958 | Armistead | 106—53 |
| 2,992,122 | 7/1961 | Beck et al. | 106—53 |
| 3,010,836 | 11/1961 | Upton et al. | 106—54 |
| 3,126,295 | 3/1964 | Young | 350—1X |
| 3,146,120 | 8/1964 | Upton et al. | 350—1X |
| 3,293,051 | 12/1966 | Searight et al. | 106—47 |
| 3,300,323 | 1/1967 | Plumat et al. | 106—52 |
| 3,410,710 | 11/1968 | Mochel | 350—1X |
| 3,419,403 | 12/1968 | Searight et al. | 106—47 |

OTHER REFERENCES

Swarts, E. L., and Pressav, J. P.: "Phototropy of Reduced Silicate Glasses Containing the 570 m$\mu$ Color Center," in Journ. Amer. Cen. Soc., 48 (7), 1965, pp. 333–338.

TOBIAS E. LEVOW, Examiner

W. R. SATTERFIELD, Assistant Examiner

U.S. Cl. X.R.

106—52, 53, 54; 350—1

UNITED STATES PATENT OFFICE
CERTIFICATE OF CORRECTION

Patent No. 3,563,771       Dated February 16, 1971

Inventor(s) CHI FANG TUNG

It is certified that error appears in the above-identified patent and that said Letters Patent are hereby corrected as shown below:

Column 2, Table II, line 44, "20-95" should read -- 20 - 70 --. Column 5, Claim 4, line 5, the $TiO_2$ weight percentage "20-95" should read -- 20 - 70 --. Below Columns 3 and 4, Table III: Superscript "1" is substitute for --2-- adjacent "Ex." and --1-- is not shown in the heading of the last column per the specifications; and under "BaO" first entry "39.33" should read --29.33--.

Signed and sealed this 12th day of November 1974.

(SEAL)
Attest:

McCOY M. GIBSON JR.      C. MARSHALL DANN
Attesting Officer      Commissioner of Patents